Figure 1:
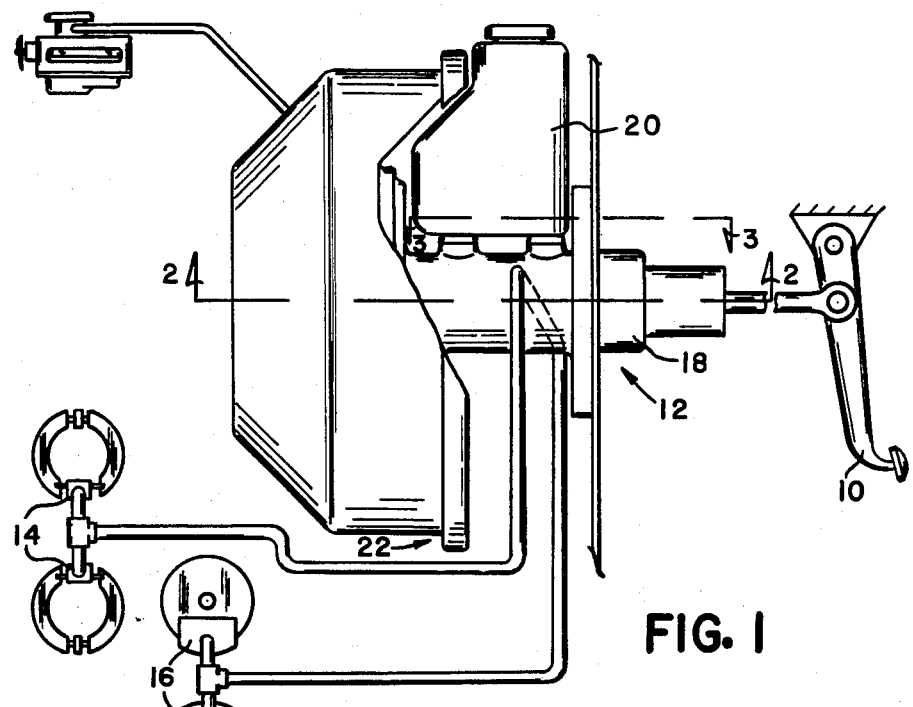

United States Patent [19]

Gaiser

[11] Patent Number: 4,625,516
[45] Date of Patent: Dec. 2, 1986

[54] BRAKE BOOSTER

[75] Inventor: Robert F. Gaiser, Stevensville, Mich.

[73] Assignee: Allied Corporation, Morristown, N.J.

[21] Appl. No.: 637,084

[22] Filed: Aug. 2, 1984

[51] Int. Cl.[4] .................................... B60T 13/20
[52] U.S. Cl. ................................ 60/554; 60/565; 60/581
[58] Field of Search ............ 60/547.1, 548, 560, 60/563, 562, 581, 554, 565

[56] References Cited

U.S. PATENT DOCUMENTS

| | | | |
|---|---|---|---|
| 2,646,665 | 7/1953 | Rockwell | 60/581 |
| 3,442,080 | 5/1969 | Rockwell | 60/581 |
| 4,255,931 | 3/1981 | Leiber | 60/547.1 |
| 4,400,943 | 8/1983 | Belart | 60/562 |
| 4,405,183 | 9/1983 | Resch | 60/563 |
| 4,505,114 | 3/1985 | Haar | 60/547.1 |
| 4,531,370 | 7/1985 | Hendrickson | 60/547.1 |
| 4,543,790 | 10/1985 | Coll | 60/547.1 |

Primary Examiner—Abraham Hershkovitz
Attorney, Agent, or Firm—Ken C. Decker

[57] ABSTRACT

A brake booster includes a housing with at least three bores to movably carry a pair of pistons and a valve assembly. A diaphragm is exposed to a fluid pressure differential to pull the pair of pistons and the valve assembly to a brake applied position wherein braking fluid pressure is generated in all three bores.

17 Claims, 5 Drawing Figures

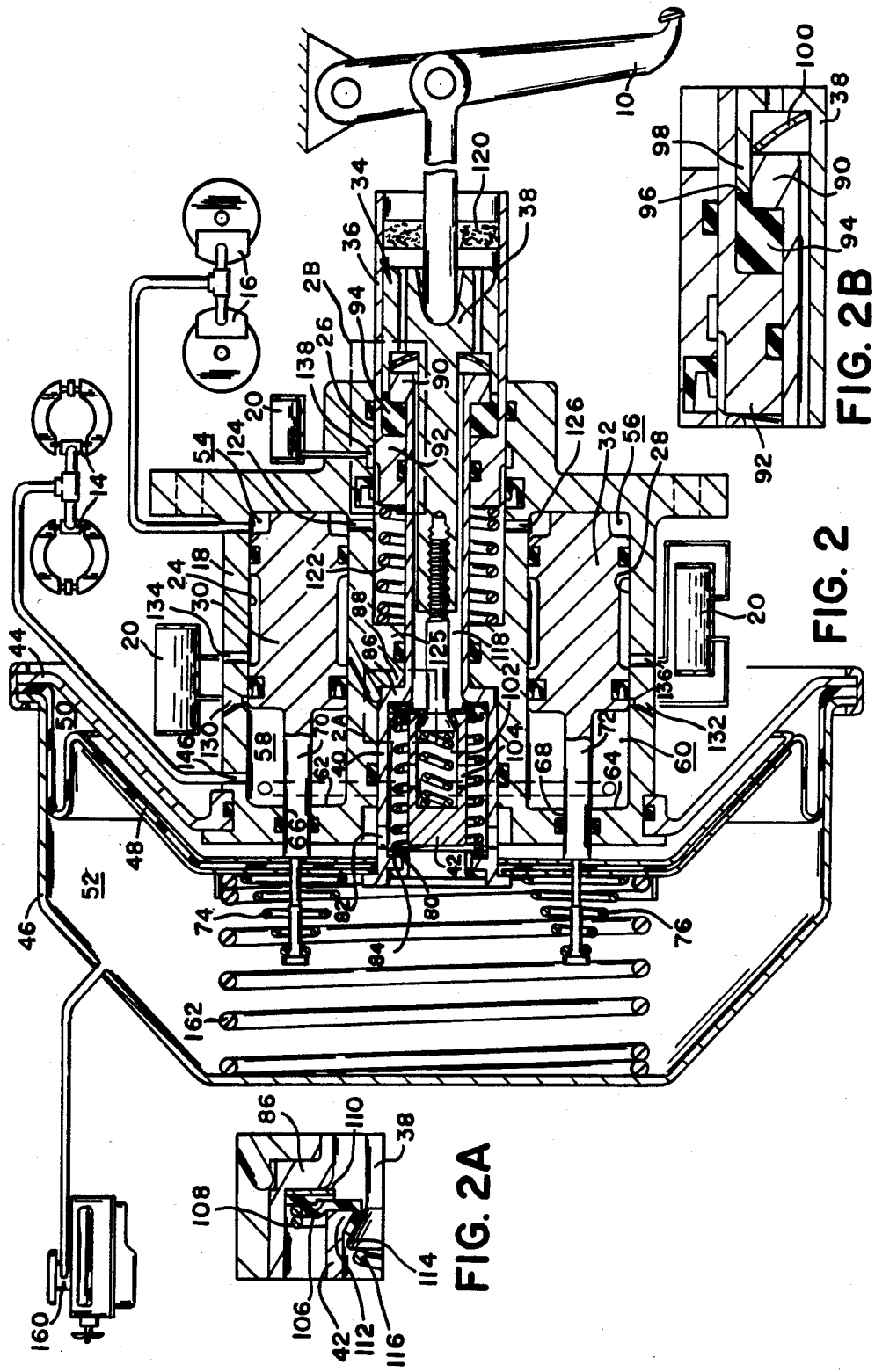

BRAKE BOOSTER

This invention relates to a brake booster wherein a pressure differential is created across a diaphragm to generate a power assist during braking.

In a puller type vacuum brake booster a master cylinder is attached to a vehicle support so that the vacuum portion of the brake booster is mounted remotely from the support. A diaphragm is exposed to a pressure differential to pull a pair of pistons in the direction of the diaphragm in order to generate fluid pressure in a primary brake circuit and a secondary brake circuit. When the puller brake booster was provided with twin parallel bores, an equalizer bar or wobbler plate was required to equalize the fluid pressure generated in the primary brake circuit and the secondary brake circuit. The equalizer bar increased the length of the brake booster. In addition, if either the primary or the secondary brake circuit experienced a leak or failure the diaphragm would provide a power assist for only one piston so that a side load was imparted to the diaphragm.

The present invention covers a brake booster comprising a housing with at least three bores, a pair of pistons movably and separately carried in two of the bores, a valve assembly movably carried in one of the bores, a diaphragm cooperating with the housing to define a pair of cavities, the valve assembly and the pair of pistons being engageable with the diaphragm, the valve assembly comprising a valve body coupled to the diaphragm, a valve member cooperating with the valve body in a rest position to open communication between the pair of cavities and a plunger cooperating with the valve member to impart movement thereto relative to the valve body and close communication between the pair of cavities so that a pressure differential is established across the diaphragm to impart movement thereto during braking, and a cylinder extending into the one bore and cooperating with the valve body and the housing to define a primary pressure chamber in the one bore, each of the pair of pistons separating a secondary pressure chamber in their respective bore from an auxiliary pressure chamber, the housing defining passages to communicate each auxiliary pressure chamber with the primary pressure chamber, the cylinder being movable in response to movement of the plunger to develop fluid pressure in the primary and the auxiliary pressure chambers, and the pair of pistons being movable in the same direction as the cylinder in response to movement of the diaphragm and also in response to fluid pressure communicated to the auxiliary pressure chamber in order to generate fluid pressure in each of the secondary pressure chambers during braking.

It is an advantage of the present invention that the primary pressure chamber is compactly arranged between the three bores and the pair of pistons are coupled to the diaphragm in the absence of an equalizer bar.

Figure 3:
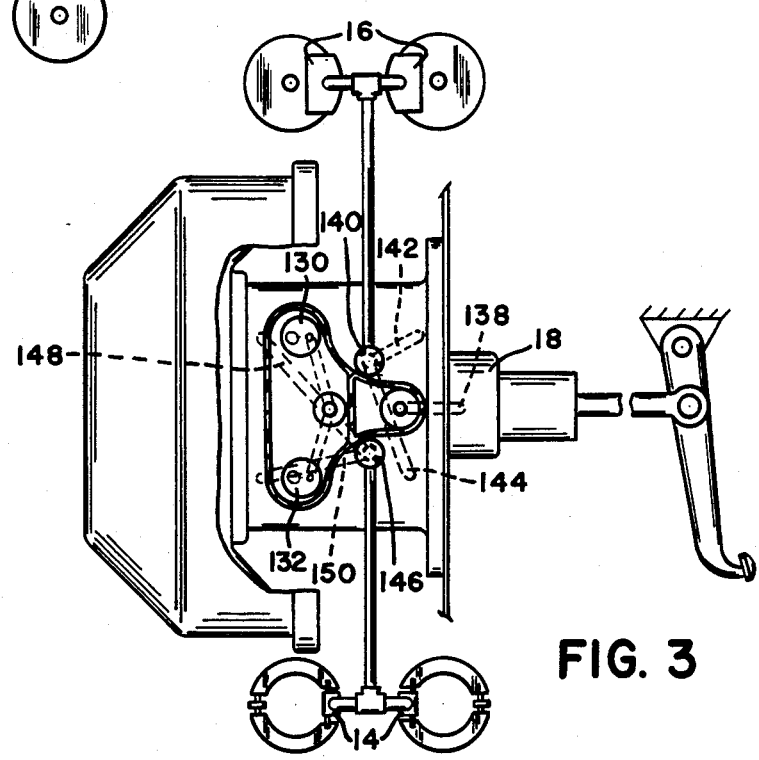

FIG. 1 is a schematic illustration of a brake system with a brake booster. FIG. 2 is a cross-section taken along line 2—2 of FIG. 1. FIGS. 2A and 2B are enlarged views of the circumscribed portions A and B of FIG. 2. FIG. 3 is a cross-section taken along line 3—3 in FIG. 1.

In FIG. 1 a brake system includes a brake pedal 10 coupled to a brake booster 12 which fluidly communicates with a first pair of brakes 14 and a second pair of brakes 16. A housing 18 for the brake booster is secured to a vehicle firewall. A reservoir 20 carries fluid communicating with the housing 18 and a vacuum actuator section 22 of the brake booster 12 is formed at the end of the housing 18 remote from the fire wall.

In the cross-sectional view of FIG. 2, the housing 18 includes three bores 24, 26 and 28. The outer bores 24 and 28 receive pistons 30 and 32, respectively, while the center bore 26 receives a valve assembly 34 and a primary piston 36 in the form of a cylinder. The valve assembly 34 comprises a plunger 38, a valve body 40 and a valve member 42. The housing 18 includes a rear shell 44 and a front shell 46 enclosing the actuator section 22 and a diaphragm 48 substantially separates a pair of cavities 50 and 52. The diaphragm 48 includes rigid backing plates and a flexible rubber disc between the plates.

The pistons 30 and 32 sealingly and movably engage the wall of bores 24 and 28, respectively, to separate a pair of auxiliary pressure chambers 54 and 56 from a pair of secondary pressure chambers 58 and 60. The housing 18 forms end walls 62 and 64 with openings 66 and 68 leading to bores 24 and 28. The pistons 30 and 32 form stems 70 and 72 extending through the openings 66 and 68 to connect with the diaphragm 48 via springs 74 and 76.

The valve body 40 is coupled to the diaphragm 48 by any suitable means such as a snap fit at a central opening 80 on the diaphragm 48. The valve body forms an opening 82 to communicate the pair of cavities 50 and 52 with each other provided the valve member 42 is spaced from a seat 84 on the diaphragm 48 at the central opening 80. A shoulder 86 on the valve body 90 abuts a shoulder 88 on the housing 18 to define a rest position for the valve body and the diaphragm 48. A trailing end 90 of the valve body 40 is enlarged to cooperate with a leading end 92 of the primary piston 36 so that a reaction disc 94 is carried between the valve body trailing end and the primary piston leading end. The trailing end 90 is also spaced from the primary piston 36 to form a radial clearance 96 so that a ridge 98 defined by the plunger 38 is disposed in the radial clearance 96 to oppose the reaction disc 94. In the next position shown the trailing end 90 forms an axial gap with the plunger 38 to receive a wave spring 100.

The valve member 42 forms an inner space 102 with an opening 104 communicating the opening 82 with the inner space 102. The valve member 42 carries one end of a sealing ring 106 at a trailing end of the valve member. The opposite end of the sealing ring 106 is retained against the valve body shoulder 86 by a spring 108. The sealing ring includes a washer 110 abutting the shoulder 86 and opposing the valve member 42. The trailing end of the valve member is turned inwardly at 112 and a leading end of the plunger 38 is turned outwardly at 114 so that the plunger 38 is engageable with the sealing ring 106 in response to a spring 116 carried within the inner space 102. The plunger 38 cooperates with the valve body 40 to form a passage 118 extending from a filter 120 to the sealing ring 106.

The primary piston leading end 92 sealingly engages the wall of bore 26 and the outer surface of the valve body 40 to substantially define a primary pressure chamber 122 between a housing land 125 defining shoulder 88 and the primary piston leading end 92. The housing 18 defines radial passages 124 and 126 communicating the primary pressure chamber 122 in bore 26 with the auxiliary pressure chambers 54 and 56 in respective bores 24 and 28.

In order to direct fluid communication between the housing 18, the reservoir 20 and the brakes 14, 16, the housing 18, viewing FIG. 3, defines inlet compensation ports 130 and 132 communicating the reservoir with the respective bores 24 and 28 and inlet fill ports 134 and 136 communicating the reservoir with the bores 24 and 28. The inlet compensation ports communicate with the secondary pressure chambers 58 and 60 when the pistons 30 and 32 are in a rest position. A further inlet compensation port 138 communicates the reservoir 20 with the primary pressure chamber 122. A first outlet port 140 communicates via diagonal passages 142 and 144 with the auxiliary pressure chambers 54 and 56 and also with the brakes 16. A second outlet port 146 communicates with the secondary pressure chambers 58 and 60 via diagonal passages 148 and 150 and also with the brakes 14.

In the rest position illustrated, the valve member 42 is spaced from the seat 84 and the plunger 38 is sealingly engaged with the sealing ring 106. Therefore, vacuum pressure from an engine manifold 160 is communicated to pressure cavity 52 and to pressure cavity 50 via central opening 80 and valve body opening 82. Atmospheric air pressure is confined to the passage 118. Depressing the brake pedal 10 during initial braking imparts movement to the plunger 38 to move the latter relative to the valve body 40. At the same time, the plunger ridge 98 imparts movement to the primary piston 36 to close port 138 and develop minimal fluid pressure in the primary pressure chamber and the auxiliary pressure chambers via the reaction disc and the valve member 42 is engaged with the valve seat 84 to close the cavity 50 from the cavity 52. Further braking moves the plunger 38 to separate the latter from the sealing ring 106 as the valve member is abutting the seat 84. Atmospheric air in passage 118 is communicated to the inner space 102, the opening 104, the opening 82 and the cavity 50. A pressure differential is established across the diaphragm 48 to move the latter against spring 162. The springs 74 and 76 are contracted to impart a force to the pistons 30 and 32 via the stems. The pistons develop a fluid pressure in secondary pressure chambers 58 and 60 to communicate the same to outlet 146 and brakes 14. With the diaphragm biased toward the front shell 46, the valve body 40 is moved with the diaphragm 48 to pull the primary piston 36 therewith via the reaction disc so that fluid pressure in the primary pressure chambers and the auxiliary pressure chambers is increased. This increased fluid pressure is communicated to the outlet 140 and to the brakes 16 so that both pair of brakes are actuated to effectuate braking for a vehicle. The increased fluid pressure in the auxiliary pressure chambers also acts against the pistons 30 and 32 to further bias the latter toward the diaphragm. Upon termination of braking suitable return springs urge the parts of the brake booster to return to their rest position as shown.

I claim:

1. A brake booster comprising a housing with at least three bores, a pair of pistons movably and separately carried in two of the bores, a valve assembly movably carried in one of the bores, diaphragm cooperating with the housing to define a pair of cavities, the valve assembly and the pair of pistons being engageable with the diaphragm, the valve assembly comprising a valve body coupled to the diaphragm, a valve member cooperating with the valve body in a rest position to open communication between the pair of cavities and a plunger cooperating with the valve member to impart movement thereto relative to the valve body and close communication between the pair of cavities so that a pressure differential is established across the diaphragm to impart movement thereto during braking, and a cylinder extending into the one bore and cooperating with the valve body and the housing to define a primary pressure chamber in the one bore, each of the pair of pistons separating a secondary pressure chamber in their respective bore from an auxiliary pressure chamber, the housing defining passages to communicate each auxiliary pressure chamber with the primary pressure chamber, the cylinder being movable in response to movement of the plunger to develop fluid pressure in the primary and the auxiliary pressure chambers, and the pair of pistons being movable in the same direction as the cylinder in response to movement of the diaphragm and also in response to fluid pressure communicated to the auxiliary pressure chambers in order to generate fluid pressure in each of the secondary pressure chambers during braking.

2. The brake booster of claim 1 in which the cylinder and the valve body carry a reaction disc therebetween.

3. The brake booster of claim 1 in which the valve body and the plunger define a gap therebetween to permit the plunger and the cylinder to move initially during braking relative to the valve body.

4. The brake booster of claim 1 in which the diaphragm defines a central opening and the valve member is engageable with the diaphragm during braking to close the central opening.

5. The brake booster of claim 1 in which the valve member defines an inner space normally communicating with both cavities in the rest position and the inner space receives a resilient member extending between the valve member and the plunger.

6. The brake booster of claim 1 in which the valve body defines a shoulder engageable with the housing to define the rest position for the valve body and a sealing member extends from the shoulder to engage the valve member.

7. The brake booster of claim 6 in which the sealing member also engages the plunger in the rest position.

8. The brake booster of claim 1 in which each piston defines a stem extending through the secondary pressure chamber and also through one of the pair of cavities to engage the diaphragm.

9. The brake booster of claim 1 in which the cylinder extends outwardly from the housing in the rest position.

10. The brake booster of claim 1 in which the cylinder and the valve body carry a reaction disc between a forward end of the cylinder and a trailing end of the valve body.

11. The brake booster of claim 10 in which the trailing end of the valve body defines a clearance with the cylinder and the plunger includes a ridge extending into the clearance to oppose the reaction disc.

12. The brake booster of claim 1 in which a spring extends between the diaphragm and each piston so that movement of the diaphragm during braking imparts movement to each piston via each spring.

13. The brake booster of claim 1 in which the housing cooperates with the cylinder to define a radial spacing and the cylinder closes one end of the radial spacing.

14. A brake booster comprising a housing with a diaphragm therein separating a pair of cavities, a valve assembly cooperating with the diaphragm to control a pressure differential between the pair of cavities, the housing defining at least three bores with the valve assembly extending into one of the three bores, the remaining two bores each receiving a piston, mechanical linkage means connecting each of said pistons to the diaphragm for movement therewith during braking characterized in that each piston substantially separates a first pressure chamber from a second pressure chamber, the first and second pressure chambers communicating with separate brake circuits, and said valve assembly cooperates with said housing to define a primary pressure chamber in the one bore communicating with one of the first and second pressure chambers in order to communicate fluid pressure from the primary pressure chamber to the one pressure chamber.

15. The brake booster of claim 14 in which said valve assembly comprises a valve body coupled to the diaphragm for movement therewith, a valve member cooperating with the valve body to open and close communication between the pair of cavities and a cylinder cooperating with the housing and the valve body to define the primary pressure chamber in the one bore.

16. The brake booster of claim 15 in which a leading end of said cylinder cooperates with a trailing end of said valve body to carry a reaction disc therebetween.

17. The brake booster of claim 15 in which said valve assembly further comprises a plunger extending into the one bore to engage the valve member and said plunger is movable relative to the valve body to impart movement to said cylinder and said valve member before said valve body is moved.

* * * * *